United States Patent
Ueda et al.

[11] Patent Number: 6,027,833
[45] Date of Patent: Feb. 22, 2000

[54] NONAQUEOUS ELECTROLYTE SECONDARY CELL

[75] Inventors: Naoki Ueda, Kariya; Hiroshi Ueshima, Anjo; Kazuaki Minato, Osaka; Takehito Mitate, Yamatotakada; Kazuo Yamada; Naoto Nishimura, both of Nara-ken, all of Japan

[73] Assignees: Denso Corporation, Aichi-pref.; Sharp Kabushiki Kaisha, Osaka, both of Japan

[21] Appl. No.: 08/979,345

[22] Filed: Nov. 26, 1997

[30] Foreign Application Priority Data

Nov. 27, 1996 [JP] Japan .................. 8-316457

[51] Int. Cl.⁷ .............. H01M 4/58; H01M 4/60; H01M 4/24
[52] U.S. Cl. ................ 429/218.1; 429/231.8
[58] Field of Search .............. 429/218.1, 197, 429/194, 231.8

[56] References Cited

U.S. PATENT DOCUMENTS

| | | | |
|---|---|---|---|
| 4,968,527 | 11/1990 | Yoshimoto et al. | 427/122 |
| 5,310,553 | 5/1994 | Simon et al. . | |
| 5,340,670 | 8/1994 | Takami et al. | 429/194 |
| 5,344,726 | 9/1994 | Tanaka et al. | 429/209 |
| 5,401,598 | 3/1995 | Miyabayashi et al. | 429/218 |
| 5,482,797 | 1/1996 | Yamada et al. | 429/218 |
| 5,494,762 | 2/1996 | Isoyama et al. . | |
| 5,576,121 | 11/1996 | Yamada et al. | 429/220 |

FOREIGN PATENT DOCUMENTS

| | | |
|---|---|---|
| 0 520 667 | 6/1992 | European Pat. Off. . |
| 0 549 802 A1 | 6/1992 | European Pat. Off. . |
| 4-368778 | 12/1992 | Japan . |
| 5-121066 | 5/1993 | Japan . |
| 5-190209 | 7/1993 | Japan . |
| 6-119939 | 4/1994 | Japan . |
| 6-132027 | 5/1994 | Japan . |

OTHER PUBLICATIONS

"Journal of Power Sources," vol. 54, No. 1, Mar. 1995, p. 1–5, Kuribayashi et al., "Battery Characteristics with Various Carbonaceous Materials".

Kuribayashi I et al: "Battery Characteristics with Various Carbonaceous Materials" Journal of Power Sources, vol. 54, No. 1, Mar. 1, 1995, p. 1.

Primary Examiner—Maria Nuzzolillo
Assistant Examiner—Tracy Dove
Attorney, Agent, or Firm—Pillsbury Madison & Sutro Intellectual Property Group

[57] ABSTRACT

A nonaqueous secondary cell comprises at least one pair of electrodes, and a separator provided between the at least one paired electrodes and impregnated with a nonaqueous electrolyte containing a mixed solvent of propylene carbonate and ethylene carbonate. At least one electrode of the at least one paired electrodes has, at least on surfaces thereof, an active substance layer made of composite carbon particles, which individually comprise a core of crystalline carbon and a low crystallinity or amorphous carbon layer formed on at least a part of the surfaces of the core, and a carbon matrix covering at least a part of the composite carbon particles and uniformly dispersing and holding the composite carbon particles therein.

17 Claims, 3 Drawing Sheets

FIG. 5

NONAQUEOUS ELECTROLYTE SECONDARY CELL

BACKGROUND OF THE INVENTION

1. Field of the Invention

This invention relates to a secondary cell having at least one electrode made of a carbon material as an active substance and a nonaqueous electrolyte, and more particularly, to an improved nonaqueous electrolyte secondary cell comprising an active substance made of a highly crystalline carbon material and, thus, having a high capacity, a high efficiency and improved low temperature characteristics.

2. Description of the Prior Art

Recently, attention has been paid to nonaqueous electrolyte secondary cells including lithium secondary cells for use as batteries of portable electric appliances and electric cars because of their high energy density and high working voltages. Some of these appliances may be used in winter or in cold districts, so that there is a demand of nonaqueous electrolyte secondary cells whose capacity and efficiency do not lower at low temperatures.

Carbon materials such as coke, graphite, graphitized carbon and the like have been proposed as active substance for electrodes of nonaqueous electrolyte secondary cells. Of these, a highly crystalline carbon material such as graphite or graphitized carbon is one of the materials which has attracted the greatest attention because of its high capacity and flat discharge potential.

On the other hand, studies have been made on a high dielectric constant solvent for nonaqueous electrolytes, and, as a result, it has been found that organic solvents such as propylene carbonate (PC) and ethylene carbonate (EC) are suitable for attaining high capacity. However, some types of solvents are very reactive with highly crystalline carbon materials and may react after repetition of charge and discharge cycles. Thus, these solvents cannot stand use as they are. Especially, propylene carbonate is very liable to undergo decomposition on the surfaces of an electrode along with the generation of gases. This eventually leads to lowerings of capacity and efficiency, and thus, cycle characteristics become poor. Ethylene carbonate has been investigated for use as a stable, high dielectric constant solvent, but because of its high solidifying point, the solvent is prone to rise in viscosity and is apt to settle when placed under low temperature conditions. Moreover, when ethylene carbonate is used in combination with low viscosity solvents such as tetrahydrofuran, 1,2-dimethoxyethane, diethyl carbonate, dimethyl carbonate, methyl ethyl carbonate and the like, satisfactory low temperature characteristics cannot be obtained.

Now, an attempt has been made, as set in Japanese Laid-open Patent Application No. 6-119939, to provide a mixed solvent prepared by mixing polypropylene carbonate and ethylene carbonate. As set out above, an electrolyte comprising propylene carbonate undergoes decomposition on repetition of charge and discharge cycles. Thus, it is not possible to attain a high discharge capacity.

Attempts have also been made not only to improve electrolytes, but also to improve a highly crystalline carbon material used as an active substance. For instance, Japanese Laid-open Patent Application No. 5-121066 proposes coverage of highly crystalline carbon particles each with a carbon material of low crystallinity. In order to avoid lowerings of capacity and efficiency, it is necessary that a carbon material of low crystallinity be used for the coverage in amounts as small as possible. However, it is very difficult to completely cover individual highly crystalline carbon particles with a thin layer of the low crystallinity carbon material according to the method set out in the above-mentioned Laid-open Application. More particularly, the method is not one which is simple and efficient from the industrial standpoint.

Japanese Laid-open Patent Application No. 6-132027 proposes an electrode which is obtained by mixing carbon particles serving as an active substance and a resin at the time of formation of an electrode and firing the mixture, thus having such a structure that the active carbon substance is combined with a carbonized product of the resin. A nonaqueous electrolyte secondary cell comprising this type of electrode is advantageous in that the carbonized product of the resin can suppress the reaction between the highly crystalline carbon and the electrolyte, thereby suppressing the decomposition of the electrolyte to an extent. However, the carbonized product is so small in amount and porous that it cannot completely cover individual particles of the highly crystalline carbon. In this sense, the decomposition of the electrolyte cannot be suppressed to a satisfactory extent.

SUMMARY OF THE INVENTION

It is accordingly an object of the invention to provide a nonaqueous secondary cell which overcomes the disadvantages of the prior art counterparts.

It is another object of the invention to provide a nonaqueous secondary cell which has a high capacity and a high efficiency along with a flat discharge potential and which has good low temperature characteristics.

We made intensive studies to solve the problems involved in prior art secondary cells using particularly propylene carbonate as a solvent for electrolyte. As a result, it was found that when at least one electrode of a nonaqueous secondary cell is made of composite carbon particles, wherein each composite carbon particle has a core of highly crystalline carbon and a low crystallinity or amorphous carbon layer formed on at least a part of the core surfaces and dispersing and holding the composite carbon particles therein, and an electrolyte comprising a mixed solvent of ethylene carbonate and propylene carbonate, the decomposition of the electrolyte can be satisfactorily suppressed. Moreover, the resultant cell has a high capacity and a high efficiency along with a flat discharge potential. In addition, when the cell is used under low temperature conditions, the mixed solvent can be substantially free of any rise in viscosity and can be prevented from the formation of any precipitate.

More particularly, according to the invention, there is provided a nonaqueous secondary cell which comprises at least one pair of electrodes, and a separator provided between at least one pair of electrodes and impregnated with a nonaqueous electrolyte containing a mixed solvent of propylene carbonate and ethylene carbonate, wherein one of at least the electrodes has, at least on surfaces thereof, an active substance layer made of composite carbon particles, which individually comprise a core of crystalline carbon and a low crystallinity or amorphous carbon layer formed on at least a part of the surfaces of the core, and a carbon matrix covering at least a part of the composite carbon particles and uniformly dispersing and holding the composite carbon particles therein.

The electrode may be entirely made of the active substance layer. Alternatively, the active substance layer may be supported with a current collector.

PREFERRED EMBODIMENTS OF THE INVENTION

The nonaqueous electrolyte secondary cell of the invention includes an electrode composed of specific types of carbon materials as at least one of negative and positive electrodes and a specific type of mixed solvent in order to improve cycle characteristics and low temperature characteristics. These characteristics are not satisfactory when using the specific type of mixed solvent. The type of cell is not critical and may be arbitrarily selected from any known cell structures depending on the purpose in end use. For instance, the cell may be a lithium secondary cell. When the electrode is applied to as an electrode for lithium secondary cells, the electrode is used as a negative electrode and a positive electrode may be made of an active substance for positive electrode. Examples of the positive electrode active substance include $LiCoO_2$, $LiNiO_2$, $LiMn_2O_4$ and the like. In addition, the cell may be of the type which includes a plurality of negative electrodes and a plurality of positive electrodes. In this case, at least one type of electrode should be made of a specific type of carbon particles.

The cell is not critical with respect to the shape thereof and may include any form such as of a coin, a button, a cylinder, a square and the like. Moreover, other members such as a counter electrode, a separator and the like may be any known ones. Specific and preferred arrangements of secondary cells useful in the present invention are described in detail in examples appearing hereinafter.

The electrode constituted of specific types of carbon materials and having a specific type of arrangement used in the nonaqueous electrolyte secondary cell of the invention, and the nonaqueous electrode comprising a specific type of mixed solvent are described.

The electrode used in the present invention should have an active substance layer at least on the surfaces thereof wherein the active substance layer is made of composite carbon particles individually consisting of a core made of crystalline carbon and a low crystallinity or amorphous carbon layer formed, on at least a part of the surfaces of the core, and a carbon matrix uniformly dispersing and holding the composite carbon particles therein so that at least a part of the individual carbon particles is covered with the carbon matrix. The portions other than the surface portions may not be critical with respect to the structure. For instance, the electrode may comprise, for example, a current collector with which the carbon matrix dispersing the composite carbon particles therein is supported. The carbon matrix is usually formed by mixing the composite carbon particles with a resin and firing the mixture. If a current collector is used, it is preferred that the mixture of the carbon particles with a resin in the form of a paste is applied to the current collector and integrally fired to provide an active substance layer fixedly combined with the current collector.

As a matter of course, the electrode may be made entirely of the composite carbon particles dispersed in the carbon matrix without use of any support or any binder.

When a current collector is used, the current collector should preferably be made of a material of high electric conductivity such as Cu. Additionally, the current collector may be made of nickel (Ni), stainless steels (SUS) or the like. The shape and size of the electrode are not critical and may be arbitrarily determined depending on the purpose in end use.

The core made of crystalline carbon is preferably made, for example, of carbon which has a highly crystalline graphite structure. Examples of the carbon include natural graphite, graphitized carbon and the like. The carbon having a crystalline graphite structure may be in any form such as of spheres, powdery masses, flakes, fibers and the like, which may be produced by any known techniques. It should be noted that if carbon particles have too small a size or too great a specific surface area, a low crystallinity or amorphous carbon layer and a carbon matrix, with which individual cores have to be at least partially covered, are required in large amounts, resulting in the lowering of capacity. In contrast, when the core size is too great, the electrode surfaces become irregular and may pass through a separator, with the great possibility that short-circuiting takes place. In order to reduce a specific surface area and to ensure a high capacity, it is preferred that the carbon particles are in the form of spheres or are similar to spheres whereby an electrolyte can be uniformly absorbed and released.

The carbon particles serving as the core should preferably have a volumetric average particle size of 1 to 80 $\mu$m, more preferably from 1 to 20 $\mu$m, and should preferably have a BET specific surface area of from 1 to 80 $m^2/g$, more preferably 1 to 15 $m^2/g$. Preferred carbon particles include spherical carbon particles of high crystallinity which are obtained by forming mesophase microbeads formed from petroleum pitch or coal tar and graphitizing the microbeads.

Preferably, when the core consisting of such crystalline carbon is subjected to the Raman spectroscopy using an argon laser having a wavelength of 514.5 nm, a ratio between the intensity of a peak within a wave number range of from 1350 to 1370 $cm^{-1}$ and the intensity of a peak within a wave number range of from 1580 to 1620 $cm^{-1}$ is 0.4 or below. Moreover, it is also preferred that the average lattice spacing, $d_{002}$, along the c axis of the graphite crystal structure is in the range of from 3.35 to 3.40 angstroms, more preferably from 3.35 to 3.37 angstroms. When using the cores having such characteristics as defined above, the resultant cell exhibits a high capacity and a flat discharge potential. Carbon which has a ratio between the peak intensities greater than 0.4 or a value of $d_{002}$ greater than 3.40 has low crystallinity, so that the resultant cell does not have a high capacity and a flat discharge potential. The average value of crystal sizes, Lc, along the axis of C in the graphite crystal structure should preferably be 200 angstroms or above.

The low crystallinity or amorphous carbon layer formed on at least a part of surfaces of individual cores is not critical with respect to the manner of formation thereof. For instance, highly crystalline carbon particles may be immersed in a liquid phase pitch or tar and fired to form the carbon layer. Alternatively, the carbon layer may be formed by thermally decomposing hydrocarbons in a gas phase to deposit a carbonized product on the cores made of crystalline carbon.

The latter method is preferred from the standpoint that a thin uniform layer can be formed on each core. The gas phase hydrocarbons may be propane, toluene, acetylene, natural gas, or the like.

Composite carbon particles each consisting of a highly crystalline carbon core and a low crystallinity or amorphous carbon layer formed thereon should preferably have a ratio of the intensity of a peak within a range of wave number of from 1350 to 1370 cm$^{-1}$ to the intensity of a peak within a range of wave number of from 1580 to 1620 cm$^{-1}$ of 0.4 or above, more preferably from 0.6 or above. When the ratio between the peak intensities is smaller than 0.4, the coverage with a low crystallinity or amorphous carbon layer is small, thus leading to the decomposition of an electrolyte. The average lattice spacing, $d_{002}$, along the axis of C of the graphite crystal structure should preferably be substantially the same as the average lattice spacing along the axis of C of the graphite crystal structure of the core, i.e. in the range of 3.35 to 3.40 angstroms. If the low crystallinity or amorphous carbon layer is formed in a thickness sufficient to cover the core such that the peaks of the core are concealed with the peaks of the carbon layer, the capacity of the resultant cell lowers.

The carbon matrix combining the composite carbon particles therewith should preferably be formed by firing and carbonizing a thermosetting resin. When using a thermosetting resin, it is likely that the shape prior to firing is maintained after the firing. As a matter of course, the carbon particles are uniformly dispersed in a thermosetting resin with or without use of any solvent for the resin prior to the firing. The thermosetting resins are those which yields a high rate of carbon residue after firing, e.g. phenol resins, furan resins and the like. A lower rate of carbon residue results in a lower coverage of composite carbon particles with a carbonized product. This leads to the lowering of capacity owing to the decomposition of an electrolyte and the lowering of electrode strength. More particularly, the rate of carbon residue should preferably be not less than 30%, more preferably not less than 60%.

When subjected to the Raman spectroscopy using an argon laser, the active substance layer composed of the composite carbon particles and the carbon matrix should preferably have a ratio of the intensity of a peak within a range of 1350 to 1370 cm$^{-1}$ to the intensity of a peak within a range of 1580 to 1620 cm$^{-1}$ of 0.4 or above, more preferably 0.7 to above. When the ratio is smaller than 0.4, the coverage of the core with a low crystallinity or amorphous carbon layer and a carbon matrix is too small, thus leading to the decomposition of an electrolyte. Further, the average lattice spacing, $d_{002}$, along the axis of C of the graphite crystal structure should preferably be substantially the same as that of the core, i.e. in the range of 3.35 to 3.40 angstroms. When the low crystallinity or amorphous carbon layer and the carbon matrix are formed in a thickness sufficient to cover the crystalline carbon core so that the peak of the core is superseded by the peaks of the carbon layer and the carbon matrix, the capacity lowers.

The active substance layer should preferably have an apparent density of 1.2 to 1.6 g/cm$^3$ as a whole and a void fraction of 26 to 44%, within which a greater capacity is expected. Especially, when such an electrode having increasing voids is applied to a lithium secondary cell, Li ions are more likely to move, resulting in better load characteristics. If the apparent density is smaller than 1.2 g/cm$^3$, the capacity becomes smaller. On the other hand, when the apparent density is greater than 1.6 g/cm$^3$, the voids become smaller, so that Li ions are more unlikely to move, thus worsening the load characteristics. It will be noted that the term "apparent density" means a value calculated by dividing the weight of the active substance layer by the volume of the layer. Likewise, the void fraction is calculated from the true densities of the composite carbon particles and the resin-carbonized product, the weight ratio therebetween, and the apparent densities thereof.

When the weight of the composite carbon particles is taken as W1 and the weight of the carbon matrix is taken as W2 in the active substance layer, the weight ratio of the carbon matrix to the composite carbon particles, W2/W1, should preferably be in the range of 0.05 to 0.3. When the value of W2/W1 is greater than 0.3 or when the amount of the carbon matrix is relatively great, the discharge capacity lowers. On the contrary, when the value of W2/W1 is smaller than 0.05 or when the amount of the carbon matrix is smaller than the above range, the electrode strength lowers. The electrode having such an arrangement as set out above can be made in the following manner. Composite carbon particles and a solution of a liquid thermosetting resin in a solvent therefor are mixed to provide a paste. The paste is applied onto a current collector. Of course, other types of resins may be used in combination with the thermosetting resin in order to improve characteristic properties such as coating properties. The content by weight of the thermosetting resin or the total solid matters of a resin mixture based on the total of the resin and the composite carbon particles should preferably be in the range of 5 to 40%, more preferably from 7 to 20%. If the content is less than 5%, a difficulty is involved in the formation of an electrode, and the amount of the carbonized product after firing is reduced, thereby lowering the electrode strength. In contrast, when the content exceeds 40%, a discharge capacity lowers.

Subsequently, the paste applied to the current collector is dried and thermally cured to provide a cured product. The thermal curing treatment should preferably be conducted by hot pressing, by which the active substance layer becomes more dense and is well shaped.

Alternatively, solid resins may also be used. In this case, the composite carbon particles and a resin powder are mixed and shaped or molded in a desired form by pressing. For the pressing, a binder such as polyvinylbutyral may be added to the mixture.

The cured product or molding is heated in an atmosphere of an inert gas such as argon, nitrogen or the like or in vacuum by a usual manner until the resin is carbonized, with which the composite carbon particles are combined through the resultant carbon matrix, thereby forming an electrode wherein the active carbon layer and the current collector are integrally combined. The heating for the carbonization is preferably carried out at a level of from a temperature at which the resin starts to be carbonized to a temperature at which the current collector does not melt, i.e. in the temperature range of from 400 to 1000° C.

The nonaqueous electrode is now described.

The nonaqueous electrolyte is a liquid electrolyte of an electrolyte or solute dissolved in a solvent therefor. In the practice of the invention, the solvent should comprise ethylene carbonate and propylene carbonate. It is preferred that propylene carbonate and ethylene carbonate are contained at such a ratio by volume that a value of propylene carbonate/ (propylene carbonate+ethylene carbonate) is 0.7 or below. If this value exceeds 0.7, the electrolyte is liable to decompose. The mixed solvent may comprise, aside from propylene carbonate and ethylene carbonate, at least one organic solvent of low viscosity such as diethyl carbonate, dimethyl carbonate, methyl ethyl carbonate, 1,2-dimethoxyethane, dimethyl ether and the like. When an organic solvent of low viscosity is contained, the resultant nonaqueous secondary cell has better low temperature characteristics. In the case, the content of propylene carbonate and ethylene carbonate based on the total of a mixed solvent including other low viscosity solvent is preferably in the range of 20 to 80% by volume, more preferably from 40 to 60% by volume. If the content of propylene carbonate and ethylene carbonate exceeds 80%, the resultant electrolyte becomes too viscous. On the other hand, when the content is smaller than 20%, a salt used as the solute does not dissociate satisfactorily, thereby worsening load characteristics.

The electrolyte or solute may be properly selected depending on the type of cell. For instance, with lithium secondary cells, the electrolyte may be Li salts such as $LiPF_6$, $LiClO_4$, $LiBF_4$, $LiCF_3SO_3$ and the like, of which $LiPF_6$ is preferred because of its high electric conductivity. With an electrolyte contains a Li salt, the Li salt is preferably present in an amount of 0.5 to 1.5 moles/liter.

In the nonaqueous electrolyte secondary cell of the invention, at least one of the electrodes comprises composite carbon particles wherein each particle consists of a core of crystalline carbon covered, at least partially, with both a low crystallinity or amorphous carbon layer and a carbon matrix of low crystallinity, so that the core covered with such low crystallinity carbon is relatively unlikely to directly contact with an electrolyte, thereby enabling one to suppress the decomposition of an electrolyte. As a result, the lowerings of a capacity and a cell efficiency as would otherwise be caused by the decomposition can be suppressed. The secondary cell of the invention has a high capacity, a high efficiency and a flat discharge potential. Moreover, since a mixed solvent of propylene carbonate and ethylene carbonate is used as a solvent of a nonaqueous liquid electrolyte, the cell exhibits good low temperature characteristics.

The invention is more particularly described by way of examples, which should not be construed as limiting the invention thereto. Comparative examples are also described.

EXAMPLE 1-1

Figure 1:
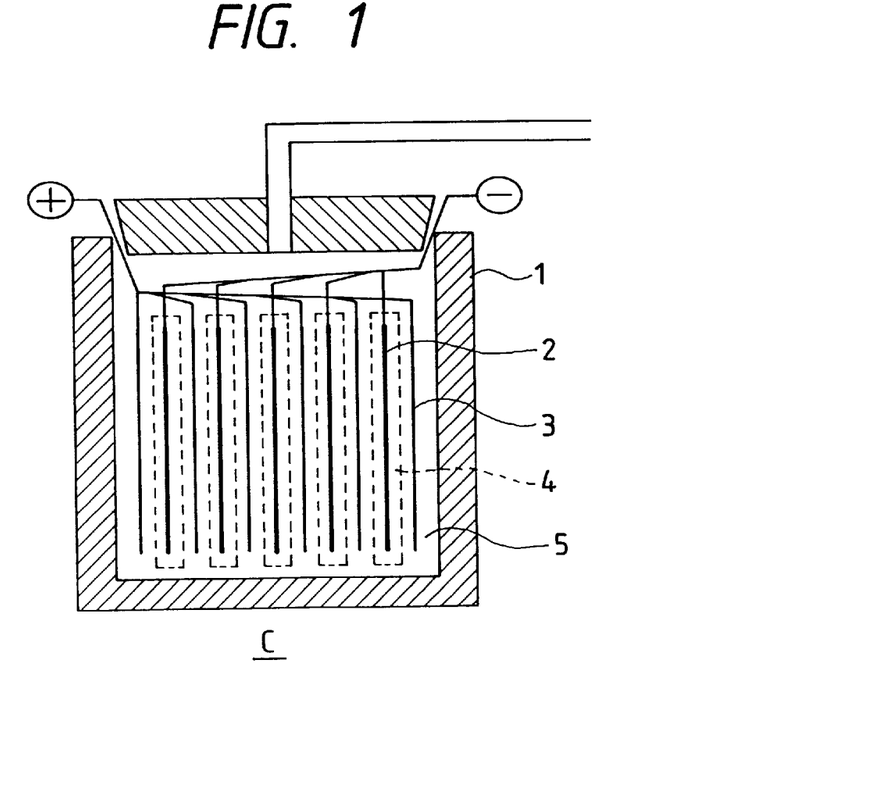
FIG. 1 is a schematic view of a nonaqueous secondary cell according to one embodiment of the invention.

In order to evaluate an effect of suppressing the decomposition of an electrolyte in a nonaqueous electrolyte secondary cell, a lithium secondary cell of the type having a simple arrangement and shown in FIG. 1 was fabricated. In FIG. 1, a lithium secondary cell C includes a cell container 1, in which a plurality of positive electrodes 2 and a plurality of negative electrodes 3 are alternately arranged so that a separator 4 are interposed between adjacent electrodes. Reference numeral 5 indicates an electrolytic solution.

This cell was fabricated in the following manner.

Positive electrode 2

$LiCoO_2$ was provided as a positive electrode active substance, and artificial graphite was used as a conductive agent. An aluminium foil was provided as a current collector. For the fabrication of a positive electrode, 9.4 g of $LiCoO_2$, 0.4 g of artificial graphite and 0.2 g of polyvinylidene fluoride (PVDF) used as a binder were added to 44 g of N-methyl-2-pyrrolidone, thereby obtaining a slurry. The slurry was applied onto both sides of the current collector according to a doctor blade method and dried at 80° C. to obtain a positive electrode.

Negative electrode 3

Figure 2:
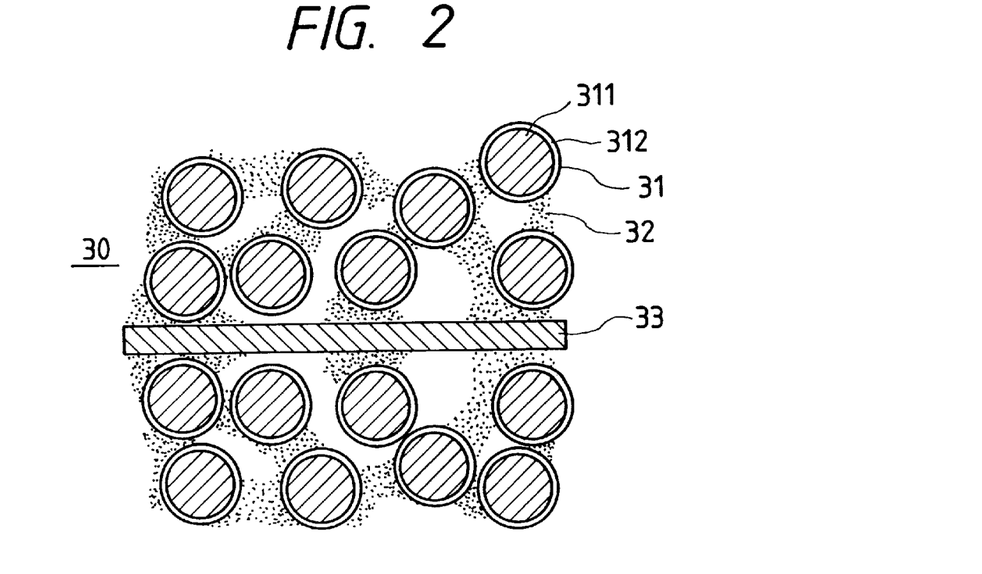
FIG. 2 is a schematic, enlarged view of part of a negative electrode of the cell of FIG. 1.

FIG. 2 is a schematic, sectional enlarged view showing part of the negative electrode. More particularly, the negative electrode 3 consisted of an active substance layer 30 made of composite carbon particles 31 and a carbon matrix 32, and a current collector 33. The composite carbon particles 31 individually consisted of a core 311 of highly crystalline carbon and a low crystallinity or amorphous carbon layer 312 at least partially covering the core 311 therewith.

Each core 311 used was made of a graphite particle obtained by graphitizing mesophase microbeads. The graphite particles had a volume average size of about 10 μm and a BET specific surface area of about 2.8 m²/g. Moreover, the ratio of a peak intensity in the range of 1350 to 1370 $cm^{-1}$ to a peak intensity in the range of 1580 to 1620 $cm^{-1}$ was 0.22 when the graphite particles were subjected to the Raman spectroscopy using an argon laser. The lattice spacing, $d_{002}$, along the axis of C of a graphite crystal structure was 3.36 angstroms with a true density of 2.2 g/cm³. Thus, the graphite particles had high crystallinity.

The graphite particles were placed in a reactor tube and heated at 750° C. in an atmosphere of a mixed gas consisting of propane and nitrogen with a propane concentration of about 25%. As a consequence, a carbon layer 312 of low crystallinity or amorphousness was formed entirely or partially on the surfaces of each core 311. The resultant composite carbon particles 31 was subjected to the Raman spectroscopy using an argon laser, revealing that a ratio of a peak intensity in the range of 1350 to 1370 $cm^{-1}$ to a peak intensity in the range of 1580 to 1620 $cm^{-1}$ was 0.68 and the lattice spacing, $d_{002}$, along the axis of C of a graphite crystal structure was 3.36 angstroms with a true density of 2.2 g/cm³. The amount of the low crystallinity amorphous carbon layer 312 on the surfaces of the core 311 was about 14 wt %.

A thermosetting phenol resin was dissolved in ethanol to obtain a phenol resin solution. The composite carbon particles 31 were added to the phenol resin solution at a ratio between the carbon particles and the phenol resin calculated as solid matter of 90:10. N-Methylpyrrolidone (NMP) was added to the mixture to provide a paste, followed by application onto a Cu foil current collector 33 on opposite sides thereof by a doctor blade method. Subsequently, the applied paste was dried at 80° C. for 1 hour, followed by hot pressing at a temperature of 150° C. under a compression pressure of 0.5 tons/cm², thereby curing the thermosetting resin to obtain a dense cured product.

The product was punched into a form of electrode by pressing and placed in a firing furnace, followed by firing at 750° C. for 3 hours in an atmosphere of nitrogen to obtain an electrode 3 wherein the active substance layer 30 and the current collector 33 were integrally combined.

In the formation of the electrode, the resin used had a rate of a carbon residue of about 62% based on the resin solid. The ratios of carbon species in the active substance layer 20 were such that core 311:low crystallinity or amorphous carbon layer 312:carbon matrix=78:12:6 on the weight basis. The active substance layer 30 had an apparent density of 1.4 g/cm² and a void fraction of 39%. The Raman spectroscopy of the active substance layer using an argon laser revealed that the ratio of a peak intensity in the range of 1350 to 1370 $cm^{-1}$ to a peak intensity in the range of 1580 to 1620 cm$^{-1}$ was about 0.74 and the average lattice spacing, d$_{002}$, along the axis of C of the graphite crystal structure was 3.36 angstroms.

Evaluation of an effect of suppressing the decomposition of an electrolyte

Using the positive and negative electrodes made above along with an electrolyte 5 made of 1 mole/liter of a LiPF$_6$ solute and a mixed solvent of 25 vol. % of propylene carbonate, 25 vol. % of ethylene carbonate and 50 vol. % of diethyl carbonate and a separator 4 made of a 25 μm thick porous polyethylene film, a lithium secondary cell 6 of the type shown in FIG. 1 was made.

The cell was charged at a current density of 3.3 mA/cm$^2$ of the negative electrode and discharged at a current density of 0.66 mA/cm$^2$. An amount of a gas generated at the time of the charge and discharge was used to evaluate the effect of suppressing the decomposition of the electrolyte. The results of measurement of the amount of a gas generated from the secondary cell are shown in Table 1 and also in FIG. 3. In Table 1 and FIG. 3, an amount of a generated gas from a lithium secondary cell made in Comparative Example 1–2 appearing hereinafter was taken as a standard of 1, and the amount of a gas in this example was expressed in a value relative to the standard. This is true of other examples and comparative examples.

EXAMPLE 1-2

The general procedure of Example 1-1 was repeated except that the composition of the solvent for the electrolyte was such that propylene carbonate:ethylene carbonate:diethylene carbonate=35:15:50 on the volume basis, thereby obtaining a lithium secondary cell.

This cell was subjected to charge and discharge under the same conditions as in Example 1-1, and an amount of a gas generated at the time of the charge and discharge was measured. The results of the measurement are shown in Table 1 and FIG. 3.

EXAMPLE 1-3

The general procedure of Example 1-1 was repeated except that the composition of he solvent for the electrolyte was such that propylene carbonate:ethylene carbonate:diethylene carbonate=45:5:50 on the volume basis, thereby obtaining a lithium secondary cell.

This cell was subjected to charge and discharge under the same conditions as in Example 1-1, and an amount of a gas generated at the time of the charge and discharge was measured. The results of the measurement are shown in Table 1 and FIG. 3.

Comparative Example 1-1

For the fabrication of a negative electrode, graphite particles serving as a core were not formed thereon with a low crystallinity or amorphous carbon layer and were mixed with a phenol resin, followed by firing in a manner similar to Example 1-1, thereby obtaining a negative electrode. The negative electrode was subjected to the Raman spectroscopy using an argon laser, revealing that a ratio of a peak intensity in the range of 1350 to 1370 cm$^{-1}$ to a peak intensity in the range of 1580 to 1620 cm$^{-1}$ was 0.4. Using this negative electrode, a lithium secondary cell was made in the same manner as in Example 1-1.

Figure 3:
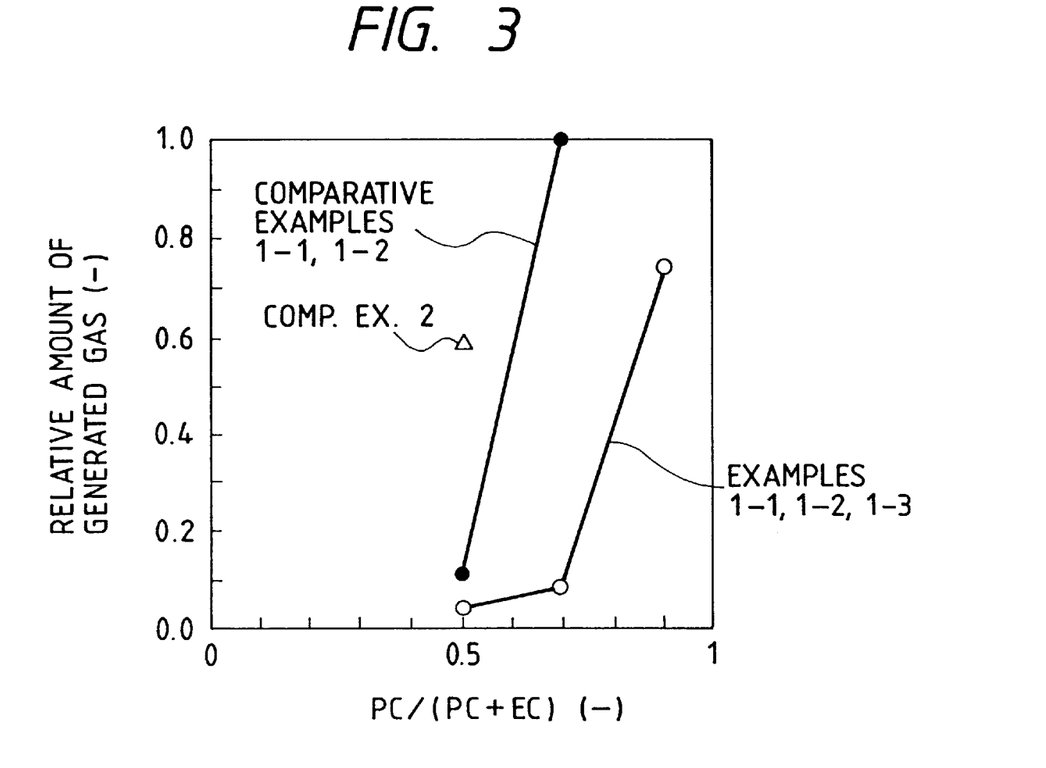
FIG. 3 is a graph showing the relation between the amount of a gas generated during charge and discharge cycles and the ratio of propylene carbonate to the total of propylene carbonate and ethylene carbonate for Comparative Examples and Examples.

The cell was subjected to charge and discharge under the same conditions as in Example 1-1 to measure an amount of a gas generated the time of the charge and discharge, with the results shown in Table 1 and FIG. 3.

Comparative Example 1-2

The general procedure of Comparative Example 1-1 was repeated using a solvent having such a composition that propylene carbonate:ethylene carbonate:diethylene carbonate=35:15:50 on the volume basis, thereby obtaining a lithium secondary cell.

The cell was subjected to charge and discharge under the same conditions as in Example 1-1, and an amount of a gas generated at the time of the charge and discharge was measured. The results of the measurement are shown in Table 1 and FIG. 3.

Comparative Example 2

For the fabrication of a negative electrode, graphite particles were mixed with polyvinylidene fluoride (PVDF) at a ratio of the particles and the PVDF of 90:10, to which N-methylpyrrolidone was added thereby providing a paste. The paste was coated into a Cu foil current collector on opposite sides thereof by a doctor blade method. The thus applied paste was dried at 80° C. for 1 hour and pressed at normal temperatures under a compression pressure of 0.5 tons/cm$^2$ to form a dense layer, followed by punching in the form of an electrode by pressing. The electrode was used to make a lithium secondary cell in the same manner as in Example 1-1.

The cell was subjected to charge and discharge under the same conditions as in Example 1-1, and an amount of a gas generated at the time of the charge and discharge was measured. The results of the measurement are shown in Table 1 and FIG. 3.

Evaluation of the Effect of Suppressing the Decomposition of Electrolytes

The results of Table 1 and FIG. 3 reveal that the cells of the invention which make use of electrolytes in which propylene carbonate is present are suppressed with respect to the amount of a gas generated at the time of charge and discharge. Especially, when the value of propylene carbonate(propylene carbonate+ethylene carbonate) is 0.7 or below, the suppressing effect is remarkable.

TABLE 1

|  | Example 1-1 | Example 1-2 | Example 1-3 | Comp. Ex. 1-1 | Comp. Ex. 1-2 | Comp. Ex. 2 |
| --- | --- | --- | --- | --- | --- | --- |
| Main active substance | composite carbon | composite carbon | composite carbon | graphite | graphite | graphite |
| Binder | carbonized product | carbonized product | carbonized product | carbonized product | carbonized product | polyvinylidene fluoride |

TABLE 1-continued

|  | Example 1-1 | Example 1-2 | Example 1-3 | Comp. Ex. 1-1 | Comp. Ex. 1-2 | Comp. Ex. 2 |
|---|---|---|---|---|---|---|
| Solvent of Electrolyte (%) | | | | | | |
| propylene carbonate | 25 | 35 | 45 | 25 | 35 | 25 |
| ethylene carbonate | 25 | 15 | 5 | 25 | 15 | 25 |
| diethylene carbonate | 50 | 50 | 50 | 50 | 50 | 50 |
| Generated Gas Ratio | 0.04 | 0.07 | 0.73 | 0.11 | 1 | 0.58 |

EXAMPLE 2

Figure 4:
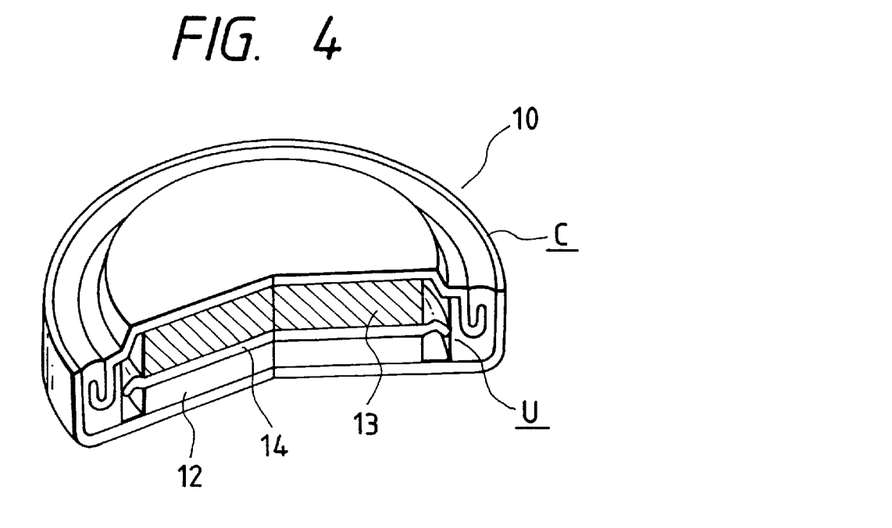
FIG. 4 is a schematic view of a nonaqueous electrolyte secondary cell according to another embodiment of the invention.

In order to evaluate a low temperature characteristic, a lithium secondary cell of the type shown in FIG. 4 was made. In FIG. 4, a lithium secondary cell 10 includes a positive electrode 12, a negative electrode 13 and a separator 14 provided between the electrodes 12, 13 to provide a cell unit U. This unit is encased in a casing C.

The positive electrode 12 and the negative electrode 13 were, respectively, made in the same manner as in Example 1-1 except that the slurry for the positive electrode and the paste for the negative electrode were, respectively, applied onto the current collectors on one side thereof. An electrolyte was impregnated in the separator 14 and was comprised of a mixed solvent whose composition was such that propylene carbonate:ethylene carbonate:diethylene carbonate= 25:25:50 on the volume basis. The separator 14 was made of a 25 μm thick porous polyethylene film.

Figure 5:
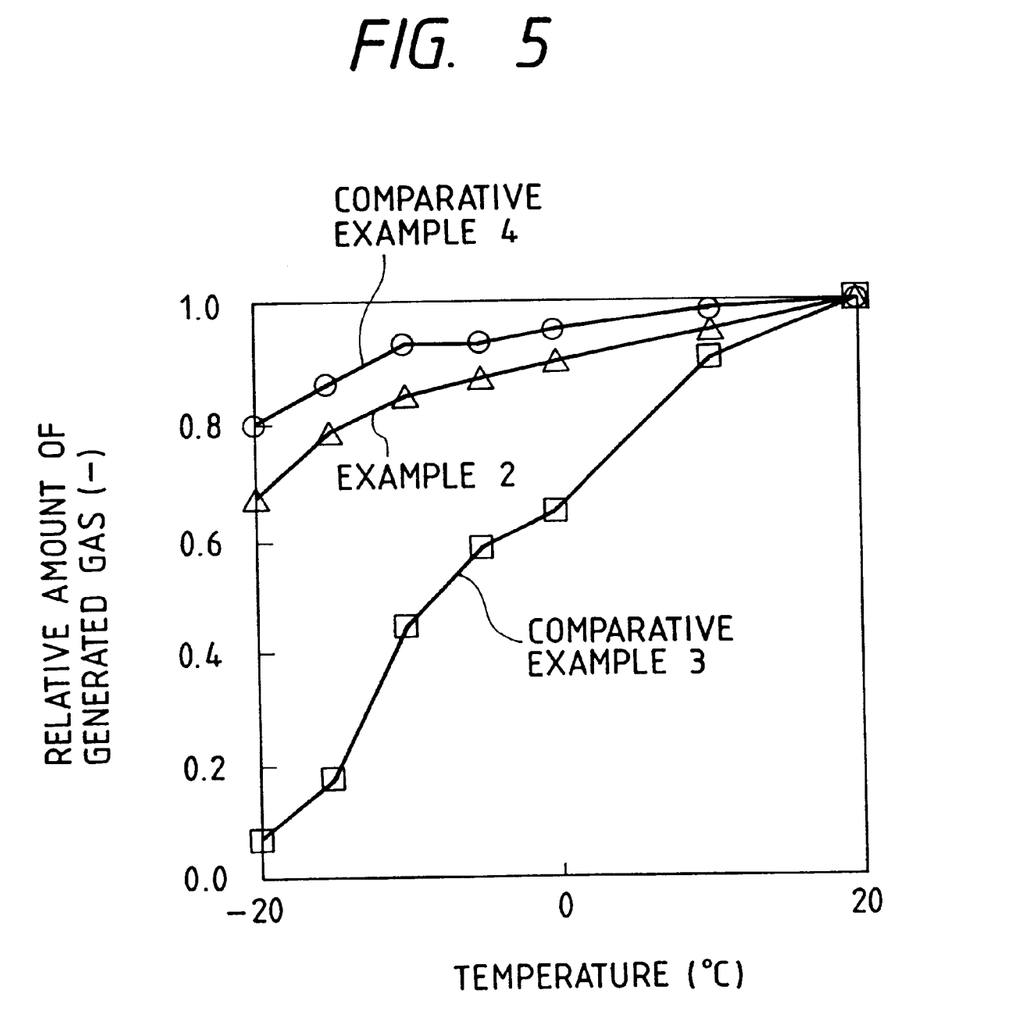
FIG. 5 is a graph showing the relation between the discharge capacity ratio and the temperature for different types of cells of Comparative Examples and Example.

The lithium secondary cell 10 was placed in a thermostatic chamber wherein a discharge capacity was measured at different temperatures between −20 to 20° C. More particularly, the discharge capacity was measured by subjecting to constant current discharge at a potential between 4.2 V and 2.75 V at a discharge current density of 0.66 A/cm$^2$ of the electrode. FIG. 5 shows a ratio of discharge capacity at different temperatures relative to a capacity at 20° C. This is true of the following comparative examples.

Comparative Example 3

The general procedure of Example 2 was repeated except that the solvent had such a composition that ethylene carbonate:diethyl carbonate=50:50 on the volume basis, thereby obtaining a lithium secondary cell. The cell was subjected to measurement of a discharge capacity at different temperatures between −20 to 20° C. in the same manner as in Example 2. The results of the measurement are shown in FIG. 5.

Comparative Example 4

The general procedure of Example 2 was repeated except that the solvent had such a composition that propylene carbonate:diethyl carbonate=50:50 on the volume basis, thereby obtaining a lithium secondary cell. The cell was subjected to measurement of a discharge capacity at different temperatures between −20 and 20° C. in the same manner as in Example 2. The results of the measurement are shown in FIG. 5.

The results of FIG. 5 reveal that with the lithium secondary cell of Example 2, the lowering of the capacity is small at a temperature between −20 to 20° C., ensuring a very good low temperature characteristic.

As will be apparent from the foregoing, the nonaqueous electrolyte secondary cell of the invention exhibits a high capacity, a high cell efficiency and a flat discharge potential and can be effectively utilized as a battery for portable electric appliances or electric automotives. Moreover, the cell has good low temperature characteristics and can be used in winter or in cold districts.

What is claimed is:

1. A nonaqueous secondary cell comprising:
at least one pair of electrodes; and
a separator provided between the at least one pair of electrodes; wherein said separator is impregnated with a nonaqueous electrolyte comprising a mixed solvent of propylene carbonate and ethylene carbonate, and wherein at least one electrode of the at least one pair of electrodes has, at least on surfaces thereof, an active substance layer comprising:
composite carbon particles, which individually comprise a core of crystalline carbon and a low crystallinity or amorphous carbon layer formed on at least a part of the surface of the core; and
a carbon matrix covering at least a part of the composite carbon particles, uniformly dispersing and holding the composite carbon particles therein, said carbon matrix comprising a carbonized product of a resin integrally combining carbon particles therewith.

2. A nonaqueous secondary cell according to claim 1, wherein when said active substance layer is subjected to the Raman spectroscopy using an argon laser, a ratio of a peak intensity in the range of 1350 to 1370 cm$^{-1}$ to a peak intensity in the range of 1580 to 1620 cm$^{-1}$ is 0.4 or above, and an average lattice spacing along the axis of C in a graphite crystal structure is in the range of 3.35 to 3.40 angstroms.

3. A nonaqueous secondary cell according to claim 1, wherein said active substance has an apparent density of 1.2 to 1.6 g/cm$^3$ and a void fraction of 26 to 44%.

4. A nonaqueous secondary cell according to claim 1, wherein said active substance layer has a ratio by weight between said carbon matrix W$_2$ and said composite carbon particles W$_1$ of 0.05 to 0.30.

5. A nonaqueous electrolyte secondary cell according to claim 1, wherein said electrode includes a current collector integrally supporting said active substance layer, and said active substance layer is integrally combined with said current collector through said carbon matrix.

6. A nonaqueous electrolyte secondary cell according to claim 1, wherein when said composite carbon particles are subjected to the Raman spectroscopy using an argon laser, a ratio of a peak intensity in the range of 1350 to 1370 cm$^{-1}$ to a peak intensity in the range of 1580 to 1620 cm$^{-1}$ is 0.4 or above, and an average lattice spacing along the axis of C in a graphite crystal structure is in the range of 3.35 to 3.40 angstroms.

7. A nonaqueous electrolyte secondary cell according to claim 1, wherein when said core is subjected to the Raman spectroscopy using an argon laser, a ratio of a peak intensity in the range of 1350 to 1370 cm$^{-1}$ to a peak intensity in the range of 1580 to 1620 cm$^{-1}$ is 0.4 or below, and an average lattice spacing along the axis of C in a graphite crystal structure is in the range of 3.35 to 3.40 angstroms.

8. A nonaqueous electrolyte secondary cell according to claim 1, wherein said carbon matrix comprises a product of a thermosetting resin carbonized by firing, wherein said thermosetting resin serves as a precursor to said carbon matrix.

9. A nonaqueous electrolyte secondary cell according to claim 1, wherein said low crystallinity or amorphous carbon layer is made of a carbonized deposit formed by thermally decomposing a gas phase hydrocarbon on said core.

10. A nonaqueous electrolyte secondary cell according to claim 1, wherein said electrolyte comprises propylene carbonate and ethylene carbonate in such an amount that a value of propylene carbonate/(propylene carbonate+ethylene carbonate) is 0.7 or below on the volume basis.

11. A nonaqueous electrolyte secondary cell according to claim 1, wherein said cell is a lithium secondary cell, and said at least one pair of electrodes consist of a pair of positive and negative electrodes wherein said at least one electrode is the negative electrode.

12. A nonaqueous electrolyte secondary cell according to claim 8, wherein an amount of residual carbon in the product obtained by carbonization of said thermosetting resin by firing is at least 30%.

13. A nonaqueous electrolyte secondary cell according to claim 12, wherein said thermosetting resin consists of a phenolic resin or a furan resin.

14. A nonaqueous electrolyte secondary cell according to claim 12, wherein said amount of residual carbon is at least 60%.

15. A nonaqueous electrolyte secondary cell according to claim 1, wherein said active substance layer comprises a fired product of a paste, wherein said fired product is obtained by dissolving a resin to be carbonized in a solvent, mixing said dissolved resin with said composite carbon particles to form the paste, applying the paste onto a metallic current collector, and thermally curing and firing the paste applied to the current collector.

16. A nonaqueous electrolyte secondary cell according to claim 1, wherein said carbon matrix comprises said resin in the range of 5–40 wt. %.

17. A nonaqueous electrolyte secondary cell according to claim 1, wherein said carbon matrix comprises said resin in the range of 7–20 wt. %.

* * * * *